April 15, 1930.  I. CASH  1,754,459
MUSICAL EDUCATIONAL TOY
Filed Dec. 31, 1928
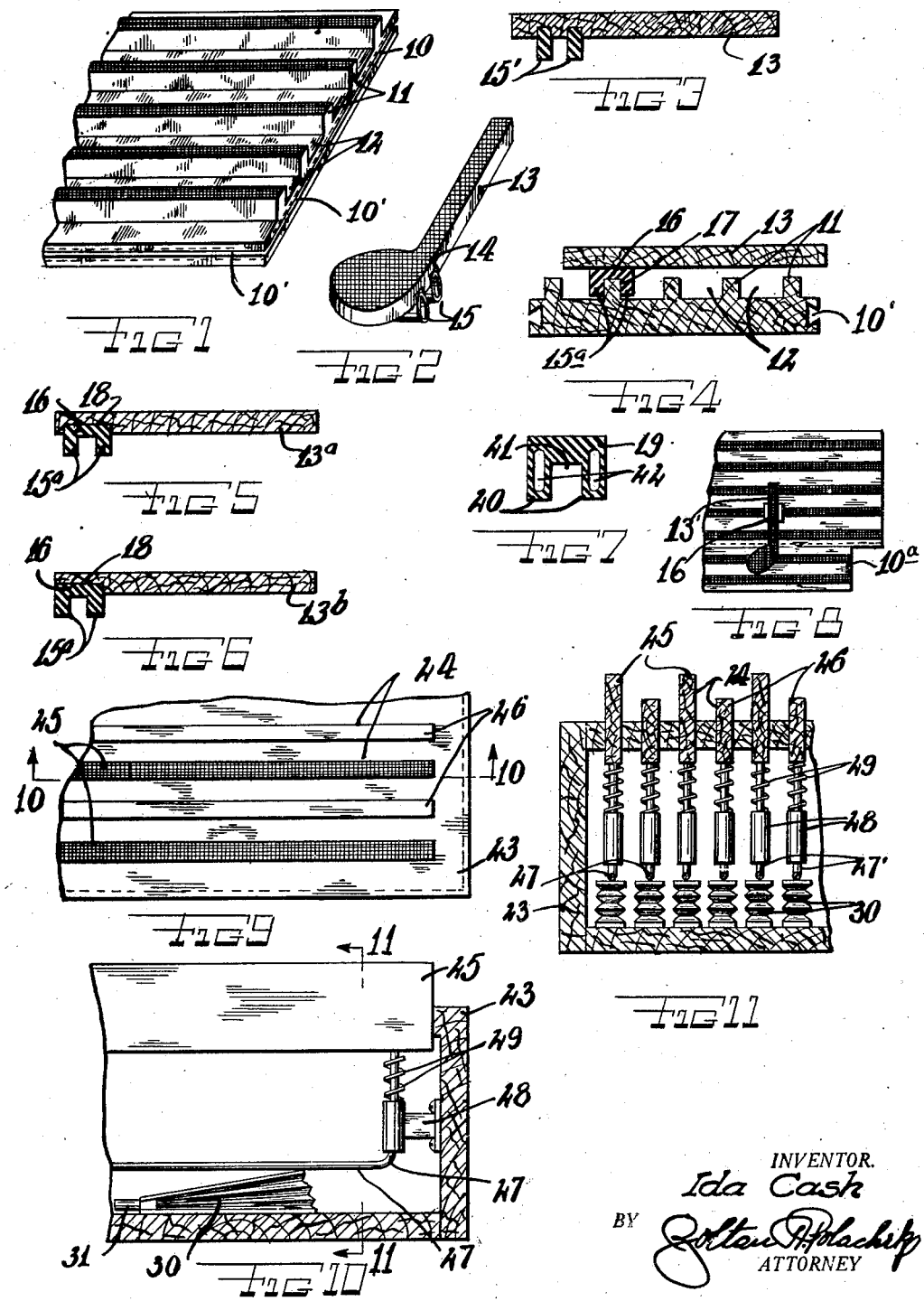
INVENTOR.
Ida Cash
BY
ATTORNEY Patented Apr. 15, 1930

1,754,459

UNITED STATES PATENT OFFICE

IDA CASH, OF BROOKLYN, NEW YORK

MUSICAL EDUCATIONAL TOY

Application filed December 31, 1928. Serial No. 329,598.

The invention relates generally to toys and has more particular reference to a novel musical educational toy.

The present invention shows a further improvement of my invention for which I filed a patent application on November 13, 1928, Serial No. 319,123.

The invention has for an object the provision of a device of the class mentioned, which is of simple durable construction, desirable in use and efficient in action, and which can be manufactured and sold at a reasonable cost.

The invention proposes the use of a flat base provided with parallel vertical projecting spaced ribs arranged for simulating the lines of a musical staff, the openings or grooves between the ribs simulating the spaces between the lines of the staff. Musical symbols are provided with a pair of bottom parallel and spaced resilient projections arranged for being forced upon any of the said ribs or in the grooves between the ribs so as to frictionally maintain fixed positions. These musical symbols may be clefs, notes, flats, sharps, naturals, bars, etc., and may be placed upon the musical staff in various desired positions for enjoyment of a child and for teaching the child the reading of music.

Extra lines may be added to the natural staff so that the musical symbols may be engaged above or below as is desired. The device may be modified so that the ribs and the spaces between the ribs are movably arranged in a vertical direction and connected for operating a sounding device tuned to give the notes indicated by the specific lines or spaces. The musical symbols may be engaged upon the lines or the spaces and when manually pressed downwards move the said lines or spaces downwards for giving the musical note represented.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a fragmentary perspective view of a base board for simulating a staff constructed according to this invention.

Fig. 2 is a perspective view of a musical symbol for use upon the base board.

Fig. 3 is a sectional view showing a musical symbol constructed according to a modified form of the device.

Fig. 4 is a view similar to Fig. 3, but showing another modified form of the device, and showing it applied upon the base board.

Figs. 5 and 6 are views similar to Fig. 3, but disclosing further modified forms.

Fig. 7 is a sectional view of a block of further modified form for use upon a musical symbol.

Fig. 8 is a fragmentary plan view showing the base board with ledger lines and the attaching means at the bottom of the stem of the note.

Fig. 9 is a plan view of a staff constructed according to modified form.

Fig. 10 is a vertical sectional view, taken on the line 10—10 of Fig. 9.

Fig. 11 is a transverse sectional view, taken on the line 11—11 of Fig. 10.

The reference numeral 10 indicates generally a flat base made of wood, metal or other suitable material and provided with a plurality of parallel vertical projecting spaced ribs 11. The spaces between these ribs are indicated by numerals 12 and may hereafter be referred to as grooves. Preferably the tops of the ribs are painted black for simulating the lines of a staff and the grooves are painted white for simulating the spaces between the lines.

In Fig. 2 a musical symbol 13 has been illustrated formed with a pair of longitudinal spaced grooves 14 on its bottom side and rubber tubes 15 are forced into these grooves 14 and are attached against displacement preferably by glue. The distance between the inner sides of the pair of rubber tubes 15 is slightly less than the width of the ribs 11 so that the musical symbol 13 may be forced upon the musical scale with the rubber tubes 15 on each side of one particular rib 11 and thus maintain a stationary position. The distance from the outer side of one of the tubes 15 to the outer side of the other tube 15 is slightly more than the width of a groove 12 so that both rubber tubes 15 may be forced into one of the grooves 12 and frictionally hold the musical symbol in a stationary position. This arrangement permits the musical symbol to be engaged upon the lines of the staff or between the lines as desired.

In the modified form of the device illustrated in Fig. 3 a pair of solid blocks 15' have been shown embedded in the musical symbol 13. These solid blocks are made from rubber or other resilient material and the distances between the inner faces and the outer faces are similar to those described relative to Fig. 2.

In the modified form of the device illustrated in Fig. 4 one solid block 16 has been shown attached to the bottom of the musical symbol 13. This solid block is provided with a central groove 17 so as to form a pair of ribs 15ᵃ. One of the ribs 11 of the staff is shown engaged within the groove 17 for supporting the musical symbol 13. The dimension from the outer face of one of the ribs 15ᵃ to the outer face of the other rib is such that the block 16 may be engaged within one of the grooves 12 and similarly support the musical symbol 13.

In the modified form of the device illustrated in Fig. 5 a block 16 has been shown partially embedded within a musical symbol 13ᵃ. When this musical symbol is engaged upon the scale it rests against the tops of the ribs 11. In other respects the operation of this form is similar to that shown in Fig. 4.

In the modified form of the device illustrated in Fig. 6 the musical symbol 13ᵇ has been illustrated with an end recess 18 and the block 16 is glued within this recess. In other respects this form of the device is similar to the previous forms.

In Fig. 7 a modified form of a resilient block has been shown for attachment on the bottom of a musical symbol and consists of a main portion 19 and projecting ribs 20. These ribs are spaced from each other for providing a central groove 21. The ribs 20 are formed with central openings 22 so that they are hollow and more resilient which quality adds to their functioning, for the purpose about described.

In Fig. 8 ledger extension 10ᵃ is attached to the main base board 10 and the musical symbol 13' is attached to the clef by any suitable attaching means above described which is secured to the under side of the stem of the musical symbol.

In the modified form of the device illustrated in Figs. 9, 10 and 11 a frame 23 has been illustrated provided with a plurality of parallel and spaced rectangular apertures 24. Large bars 25 are engaged within alternate apertures 24 and small bars 26 are engaged in the remaining apertures. The large bars are merely of greater height and have their top edges painted black for simulating the lines of a musical staff. The bars 26 are preferably painted white on the top and simulate the spaces between the lines of the staff.

Each of these bars have a rod 27 attached to their lower sides. In Fig. 10 only one side of the device has been shown, but the other side is symmetrical to this side. The rods 27 have vertical portions 27' slidably mounted in standards 28 attached upon the frame 23. Springs 29 are coaxially mounted on the rod portions 27' and act between the standards 28 and the bars. These springs normally hold the bars in positions as shown in Fig. 11. A plurality of bellows 30 are mounted on the bottom of the frame 23 and each bellows has a pipe 31 representing a particular note. The bars 27 act upon the bellows so that when the blocks 25, 26 are depressed, the bellows are operated for sounding the note of their pipe 31.

In operation of the device, the musical symbols are engaged upon the lines 25 or the spaces 26, said lines and spaces in this particular form of the device being in reality bars 25 and 26. The musical symbols may be depressed for forcing the bars 25, 26 downwards so that a child playing with the device may also learn the tones simulated by each of the musical symbols.

It is to be understood that the numeral 13 refers to any musical symbol such as notes, bars, strokes, clefs, flats, sharps, naturals, rests, ledger lines, measure timing numerals, etc.

A plurality of base members 10 may be attached together along their side, bottom or top edges by joining them at edge grooves 10'.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a musical board having parallel ribs simulating the lines of a staff, a musical symbol, and a pair of spaced parallel rubber tubes attached on the bottom of the symbol for engaging the ribs and holding the symbol in place on the board.

2. In combination with a musical board having parallel ribs simulating the lines of a staff, a musical symbol, and a pair of spaced parallel rubber tubes attached on the bottom of the symbol for engaging the ribs and holding the symbol in place on the board, the distance between the rubber tubes being slightly less than the width of said ribs.

3. In combination with a musical board having parallel ribs simulating the lines of a staff, a musical symbol, and a pair of spaced parallel rubber tubes attached on the bottom of the symbol for engaging the ribs and holding the symbol in place on the board, the distance between the rubber tubes being slightly less than the width of said ribs, and the distance between the outer sides of the tube being slightly more than the width of the spaces between adjacent ribs.

4. A device of the class described, comprising a flat base with parallel projecting ribs spaced to provide grooves, and a musical symbol with a pair of projecting resilient members adapted to engage on the ribs or in the said grooves, said resilient members being rubber tubes attached on the bottom of the symbol.

In testimony whereof I have affixed my signature.

IDA CASH.